UNITED STATES PATENT OFFICE.

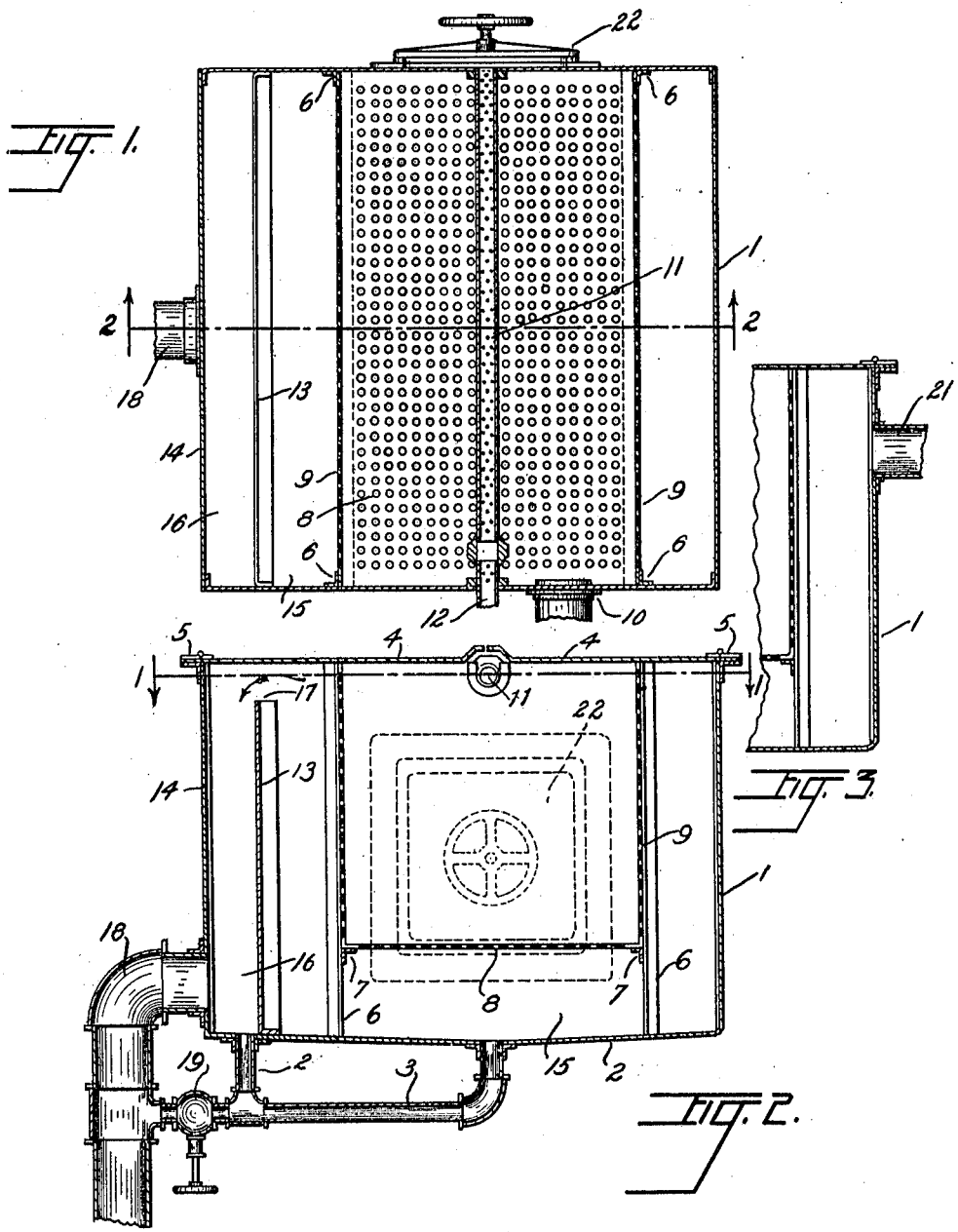

GEORGE E. LAUBENHEIMER, OF CHICAGO, ILLINOIS.

HOP-STRAINING DEVICE.

984,434.   Specification of Letters Patent.   Patented Feb. 14, 1911.

Application filed January 21, 1910. Serial No. 539,412.

*To all whom it may concern:*

Be it known that I, GEORGE E. LAUBENHEIMER, a citizen of the United States, and residing at Chicago, in the county of Cook and State of Illinois, have invented a new and useful Improvement in Hop-Straining Devices, of which the following is a complete specification.

This invention relates to improvements in hop straining devices and more particularly to a device so constructed that the hops will not clog the strainer or screen.

Heretofore it has been customary to provide the strainer tank with an outlet at its bottom for the wort, with the result that a downward current or flow is provided in the tank on all sides and at the bottom of the strainer which tends to draw the hops into the meshes of the strainer and stop the flow of wort therethrough.

The main objects of this invention are to provide a hop straining device in which the strainer is kept submerged in the wort while in operation; to provide a device in which the hops are caused to float, or are suspended, in the wort in the strainer, so as not to clog the strainer; and to provide a hop straining device in which the tank outlet is so situated that downward flow through the tank is practically eliminated.

A specific construction embodying said invention is illustrated in the accompanying drawings, in which:

Figure 1 is a horizontal section of the device taken on line 1—1 of Fig. 2. Fig. 2 is a vertical section taken on line 2—2 Fig. 1. Fig. 3 is a fragmentary section of the device with a modified form of outlet.

In the construction shown, the tank 1 is constructed of suitable non-corrodible sheet metal, and is provided with a bottom 2 which slopes downwardly from all sides toward a drain pipe 3 opening therefrom.

Covers 4 are connected to the tank by means of hinges 5 and afford access to the interior of the tank for the purpose of cleaning it or removing the strainer.

On the inner sides of the end walls of the tank are uprights or posts 6, and connecting oppositely disposed posts are sills or girders 7 which are supported a distance from the bottom of the tank. Supported on said girders is the perforated bottom plate 8 of the strainer, and extending upwardly therefrom are the perforated side plates 9 of the strainer which extend from end to end of the strainer.

An inlet pipe 10 for the wort and hops extends through one end wall of the tank into the strainer, and a spraying or flushing nozzle 11, adapted to wash the separated hops, is supported in the upper portion of the strainer and is connected to a water pipe 12 leading from any suitable source of supply.

To produce the best results the outlet for the separated wort is placed as near the top of the tank 1 as practicable, so that the strainer will be approximately submerged when in operation. The preferred form of outlet is to provide a partition 13 between the strainer and the side wall 14 of the tank, which partition extends upwardly from the bottom of the tank to near the cover 4, and is connected at its ends to the end walls of the tank. The partition thus divides the tank into a strainer chamber 15 and a pumping chamber 16, and the passage 17 over the top of the partition affords an outlet from the upper portion of the strainer chamber to the pumping chamber.

A pipe 18 opens from near the bottom of the pumping chamber 16 and may be connected to a pump, not shown, for drawing off the wort. The drain pipe 3 opens into the pump pipe below the tank and is provided with a valve 19. A drain pipe 20 opens from the bottom of the pumping chamber into the pipe 3, back of the valve 19.

If desired the partition 13 may be dispensed with and the pump pipe 21 may be connected directly with the top or upper portion of the tank, as shown in Fig. 3.

For convenience in removing the hops from the strainer, the tank is provided with a door 22 opening into the strainer and having its bottom approximately on a level with the bottom of the strainer.

The operation of the construction shown is as follows: When the wort and hops are permitted to flow into the device through the pipe 10, the wort will pass through the strainer and fill the tank or strainer compartment up to the outlet, whether the outlet be the passage 17 over the partition 13, or the direct opening to the pipe 21. The greater portion of the strainer is thereby submerged, and owing to the fact that the wort is on both sides of the walls of the strainer, all of the tendency of the wort to flow rapidly through the strainer is obviated, and a zone of comparative quiet is produced in and about the strainer. This permits the hops to flow into the strainer without being forced into its meshes. Where the partition is employed the wort is drawn off from the pumping chamber and owing to the fact that the chamber is of sufficient size to contain several barrels of wort, the force of the pump is not felt on the wort in the strainer chamber. Inasmuch as the outlet from the strainer chamber is near the top of the tank, but very slight current is produced in the wort beneath its surface, and whatever under current there may be has an upward tendency and aids in keeping the meshes of the strainer clear.

Obviously a hop straining device constructed in accordance with this invention is adapted to overcome the difficulty heretofore encountered by reason of the hops clogging up the strainer, and obviously also many of the details of the construction shown may be varied or omitted without departing from the spirit of the claims.

I claim:

1. A hop straining device, comprising a tank, a strainer in the tank adapted to be submerged by the wort and out of contact with the sides and bottom of the tank, an outlet from the tank opening from near the top of the strainer but disconnected therewith, and a pipe leading from the bottom of the tank and in open communication with the outlet.

2. A hop straining device, comprising a tank, a strainer in the tank spaced a distance from the sides and bottom of the tank and adapted to be submerged by the wort, means for delivering hops and wort to the strainer, a partition extending upwardly from the bottom of the tank to near the top of the strainer, there being an outlet near the bottom of the tank on the opposite side of the partition from the strainer, and means affording open communication between the bottom of the tank beneath the strainer and said outlet.

3. A hop straining device, comprising a tank, a strainer supported in the upper portion of the tank and out of contact with the sides and bottom of the tank, said strainer having perforated sides and bottom, an outlet near the bottom of the tank in one side thereof, and means between the outlet and the strainer affording a barrier over which the filtrant must pass to reach the outlet.

4. A hop straining device, comprising a tank having an outlet at one side thereof, a partition extending across the tank near the outlet and terminating near the top of the tank, and a strainer extending downwardly from the top of the tank to a point below the top of the partition and on the opposite side of the partition from said outlet, said strainer having perforated sides and bottom for the passage of the wort therefrom to the tank.

5. A hop straining device, comprising a tank having an outlet at one side thereof, a strainer having perforated sides and bottom and extending from the top to near the bottom of the tank, and means interposed in the tank between said strainer and said outlet and adapted to cause the wort to flow to the top of the tank before passing to the outlet.

6. A hop straining device, comprising a tank, a partition in the tank and providing a passage from one side thereof to the other near the top of the tank, a strainer in the tank on one side of the partition and extending downwardly below the top of the partition, a draw-off pipe opening from the tank on the opposite side of the partition from the strainer, a valved drain pipe opening from the bottom of the tank to said draw-off pipe and a pipe connecting the tank on the opposite side of the partition from the strainer with said valved pipe.

In testimony whereof I have hereunto subscribed my name in the presence of two witnesses.

GEORGE E. LAUBENHEIMER.

Witnesses:
W. W. WITHENBURY,
O. R. WALKER.